United States Patent
Wagh et al.

(10) Patent No.: US 7,745,679 B2
(45) Date of Patent: Jun. 29, 2010

(54) METHOD OF WASTE STABILIZATION WITH DEWATERED CHEMICALLY BONDED PHOSPHATE CERAMICS

(75) Inventors: Arun Wagh, Naperville, IL (US);
Martin D. Maloney, Evergreen, CO (US)

(73) Assignee: CH2M Hill, Inc., Englewood, CO (US)

( * ) Notice: Subject to any disclaimer, the term of this patent is extended or adjusted under 35 U.S.C. 154(b) by 920 days.

(21) Appl. No.: 10/547,445

(22) PCT Filed: Feb. 26, 2004

(86) PCT No.: PCT/US2004/005676

§ 371 (c)(1),
(2), (4) Date: Jun. 8, 2006

(87) PCT Pub. No.: WO2004/076375

PCT Pub. Date: Sep. 10, 2004

(65) Prior Publication Data

US 2006/0235258 A1    Oct. 19, 2006

Related U.S. Application Data

(60) Provisional application No. 60/450,563, filed on Feb. 26, 2003, provisional application No. 60/499,453, filed on Sep. 2, 2003, provisional application No. 60/537,207, filed on Jan. 18, 2004.

(51) Int. Cl.
A62D 3/00 (2007.01)
B09B 1/00 (2006.01)

(52) U.S. Cl. .................. 588/300; 588/249
(58) Field of Classification Search ............... None
See application file for complete search history.

(56) References Cited

U.S. PATENT DOCUMENTS 3,416,888 A    12/1968    Notari
(Continued)

FOREIGN PATENT DOCUMENTS

JP    63015200    *    7/1986
(Continued)

OTHER PUBLICATIONS

U.S. Appl. No. 10/547,100, filed Jan. 8, 2008, Wagh et al.
(Continued)

Primary Examiner—Melvin C Mayes
Assistant Examiner—Sheng Han
(74) Attorney, Agent, or Firm—Dorsey & Whitney LLP

(57) ABSTRACT

A method of stabilizing a waste in a chemically bonded phosphate ceramic (CBPC). The method consists of preparing a slurry including the waste, water, an oxide binder, and a phosphate binder. The slurry is then allowed to cure to a solid, hydrated CBPC matrix. Next, bound water within the solid, hydrated CBPC matrix is removed. Typically, the bound water is removed by applying heat to the cured CBPC matrix. Preferably, the quantity of heat applied to the cured CBPC matrix is sufficient to drive off water bound within the hydrated CBPC matrix, but not to volatalize other non-water components of the matrix, such as metals and radioactive components. Typically, a temperature range of between 100° C.-200° C. will be sufficient. In another embodiment of the invention wherein the waste and water have been mixed prior to the preparation of the slurry, a select amount of water may be evaporated from the waste and water mixture prior to preparation of the slurry. Another aspect of the invention is a direct anyhydrous CBPC fabrication method wherein water is removed from the slurry by heating and mixing the slurry while allowing the slurry to cure. Additional aspects of the invention are ceramic matrix waste forms prepared by the methods disclosed above.

29 Claims, 2 Drawing Sheets

U.S. PATENT DOCUMENTS

| | | | |
|---|---|---|---|
| 4,351,749 A | 9/1982 | Ropp | |
| 4,412,861 A | 11/1983 | Kreuzmann | |
| 4,819,571 A | 4/1989 | Hallett | |
| 5,200,033 A | 4/1993 | Weitzman | |
| 5,246,496 A | 9/1993 | Sugama | |
| 5,285,000 A | 2/1994 | Schwitzgebel | |
| 5,304,710 A | 4/1994 | Kigel et al. | |
| 5,457,266 A | 10/1995 | Bege et al. | |
| 5,541,386 A | 7/1996 | Alvi et al. | |
| 5,645,518 A * | 7/1997 | Wagh et al. | 588/318 |
| 5,653,872 A * | 8/1997 | Cohan | 210/252 |
| 5,678,233 A | 10/1997 | Brown | |
| 5,732,367 A | 3/1998 | Yost et al. | |
| 5,830,815 A | 11/1998 | Wagh et al. | |
| 5,840,638 A | 11/1998 | Cao et al. | |
| 5,846,894 A * | 12/1998 | Singh et al. | 501/155 |
| 6,133,498 A | 10/2000 | Singh et al. | |
| 6,153,809 A * | 11/2000 | Singh et al. | 588/255 |
| 6,204,214 B1 | 3/2001 | Singh et al. | |
| 6,258,994 B1 | 7/2001 | Jantzen et al. | |
| 6,283,908 B1 | 9/2001 | Powell et al. | |
| 6,498,119 B2 | 12/2002 | Wagh et al. | |
| 6,518,212 B1 | 2/2003 | Wagh et al. | |
| 6,776,837 B2 | 8/2004 | Wagh et al. | |
| 7,294,291 B2 | 11/2007 | Wagh et al. | |
| 2002/0009622 A1 | 1/2002 | Goodson | |
| 2003/0131759 A1* | 7/2003 | Francis et al. | 106/286.1 |
| 2004/0004885 A1 | 1/2004 | Comps et al. | |
| 2004/0005794 A1 | 1/2004 | Yamashita | |

FOREIGN PATENT DOCUMENTS

| | | | |
|---|---|---|---|
| JP | 63015200 A | | 7/1986 |
| JP | HEI 7-204605 | | 8/1995 |
| JP | 2002131481 | * | 5/2002 |
| WO | WO 2004075207 | | 9/2004 |

OTHER PUBLICATIONS

Bothe V. et al., "Low temperature synthesis of AlPO," Ceram. Trans., 1991, 16:689-699.

Gonzalez F. et al, "Reaction of orthophosphoric acid with several forms of aluminum oxide," 1980, vol. 59, No. 7 pp. 727-738.

Silsbee M. et al., "Bonding aluminum phosphate ceramics prepared at low temperature," The Pennsylvania State University Materials Research Society, 1988, 114:295-300.

Silva P. et al., "An ICPP aluminum phosphate ceramic waste form: synthesis and room-temperature aqueous stability," The Pennsylvania State University Materials Research Society, 1984, 8:263-271.

Wagh A. et al., "Chemically bonded phosphate ceramics: II warm-temperature process for alumina ceramics," American Ceramic Society, 2002, p. 1-13.

Office Action dated Aug. 9, 2006, U.S. Appl. No. 10/782,278, 8 pages.

Amendment dated Nov. 18, 2006, U.S. Appl. No. 10/782,278, 13 pages.

Office Action dated Feb. 5, 2007, U.S. Appl. No. 10/782,278, 5 pages.

Amendment dated May 4, 2007, U.S. Appl. No. 10/782,278, 8 pages.

Notice of Allowance dated Oct. 4, 2007, U.S. Appl. No. 10/782,278, 8 pages.

* cited by examiner

METHOD OF WASTE STABILIZATION WITH DEWATERED CHEMICALLY BONDED PHOSPHATE CERAMICS

CROSS-REFERENCE TO RELATED APPLICATION(S)

This application is a U.S. National phase application of PCT Application No. PCT/US2004/005676, filed Feb. 26, 2004. This application claims the benefit of priority to above-references PCT/US2004/005676; U.S. Provisional Patent Application No. 60/450,563, entitled PHOSPHATE BONDED CERAMIC STABILIZATION CHEMISTRY APPLIED TO HIGH LEVEL RADIOACTIVE WASTES, filed on Feb. 26, 2003; U.S. Provisional Patent Application No. 60/499,453, entitled ALUMINUM PHOSPHATE CERAMICS FOR HAZARDOUS WASTE STORAGE, filed on Sep. 2, 2003; and U.S. Provisional Patent Application No. 60/537,207, entitled ALUMINUM PHOSPHATE CERAMICS FOR HAZARDOUS WASTE STORAGE, filed on Jan. 18, 2004, all of which are incorporated herein in their entirety by reference. In addition, concurrently filed U.S. Application No. 10/547,100 entitled "Aluminum Phosphate Ceramics for Waste Storage," which names D. Maloney and A. Wagh as inventors, and is identified by, is incorporated in its entirety by reference.

STATEMENT REGARDING FEDERALLY SPONSORED RESEARCH

The United States Government has rights in this invention pursuant to contract number W-31-109-ENG-38 between the United States Department of Energy and the University of Chicago, representing Argonne National Laboratory, and CRADA Number 0200201 between Argonne National Laboratory and CH2M Hill, Inc.

TECHNICAL FIELD

The present invention relates to the use of chemically bonded phosphate ceramic (CBPC) waste forms for immobilizing waste, and in particular the use of dewatered CBPCs to prepare waste forms having enhanced resistance to radiolysis for stabilizing radioactive wastes and having optimized waste form volume.

BACKGROUND ART

Liquid, semi-liquid, semi-solid, and solid high level waste streams are generated in the initial production, reprocessing, or recovery of nuclear materials. Historically, these wastes have been stored while awaiting finding and reliable technology for treatment and disposal. There are numerous storage sites for such wastes worldwide, mostly in countries that have or had nuclear weapons programs or nuclear power production facilities. Many of these waste streams have characteristically high concentrations of common non-radioactive, inorganic ions such as chlorides, sulfates, and nitrates of potassium, sodium, and calcium together with minor concentrations of highly radioactive components such as plutonium, cesium, technetium, strontium, and many other transuranics. Some waste streams may also contain non-radioactive hazardous components such as mercury, lead, organics, fluorides, other salts, acids and bases, aqueous and non-aqueous substances, or other wastes and non-wastes in liquid, solid, or sludge form.

Stabilization of these wastes requires that the contaminants, including soluble heavy metals ions, be effectively immobilized. Conventional high-temperature waste treatment methods (e.g., incineration, vitrification) are largely unsuitable for the treatment of the waste streams described above because their reliance on high temperature risks the release of volatile contaminants. In addition, high temperature processes generate undesirable secondary waste streams. A known low temperature approach is to stabilize hazardous waste by using inorganic (e.g., pozzolanic) binders, such as cement, lime, kiln dust, and/or fly ash. Disadvantages of this approach include a high sensitivity to the presence of impurities, high porosity solid waste forms, and low waste loading and thus high volume waste forms. Organic binders (e.g., thermosetting polymers) are used even less frequently because of cost and greater complexity of application. Organic binders are not compatible with water based wastes, unless the waste is first pretreated and converted to an emulsion or solid, and organic binders are subject to deterioration from environmental factors including biological action and exposure to ultraviolet light. Also, organic binders further contribute to radiolytic $H_2$ generation within a waste form.

Recently, an alternative low temperature approach has been developed at Argonne National Laboratory for stabilizing and solidifying low level mixed waste by incorporating or loading the waste into a chemically bonded phosphate ceramic (CBPC) waste form. This technique immobilizes the waste by solidification, such that the waste is physically microencapsulated within the dense matrix of the ceramic. Encapsulation systems are particularly attractive given that the bonds formed in these systems are either ionic or covalent or both, and hence stronger than the hydration bonds in cement systems. Also, the ceramic formulation process is exothermic and economical. Phosphates are particularly good candidates for stabilization of radioactive and hazardous waste because phosphates of radio nuclides and hazardous metals are essentially insoluble in groundwater.

U.S. Pat. No. 5,645,518, issued to Wagh, et al., incorporated herein by reference, describes in detail the process steps for setting liquid or solid waste in certain CBPC products using acid-base reactions. The CBPC products disclosed in U.S. Pat. No. 5,645,518 exhibit a complex structure including a major crystalline phase, e.g., newberyite ($MgHPO_4.3H_2O$), and an insoluble, stable phase. The waste components are generally homogeneously distributed within the phosphate ceramic matrix.

U.S. Pat. No. 5,830,815, also issued to Wagh, et al., incorporated herein by reference, describes improving the CBPC fabrication process by incorporating two temperature control processes. A superior CBPC product, magnesium-potassium phosphate hexahydrate (MKP) ($MgKPO_4.6H_2O$) is also disclosed in U.S. Pat. No. 5,830,815.

MKP is formed by bypassing the use of an acid and mixing the oxide powder with dihydrogen phosphates of potassium to form a ceramic at a higher pH. CBPCs which are similar to MKP can be formed from dihydrogen phosphates or other monovalent metals. MKP is formed in accordance with equation (1) below:

$$MgO + KH_2PO_4 + 5H_2O \rightarrow MgKPO_4.6H_2O \quad (1)$$

A CBPC waste form such as MKP is a dense, hard material with excellent durability and a high resistance to fire, chemicals, humidity, and MKP ceramic products have been extensively studied by the United States Department of Energy for waste treatment projects.

CBPCs as described in the above patents have proven somewhat problematic for stabilizing radioactive wastes, particularly high activity radioactive wastes. Each of the commonly formulated CBPCs is a hydrated ceramic product with water bound within the ceramic matrix. For example, MKP ($MgKPO_4.6H_2O$) has six bound water molecules for each ceramic molecule, and other MKP formulations can have as much as 22 molecules $H_2O$ for each ceramic molecule. Radioactive wastes typically radiate α-, β-, n-particles, and γ-rays, which can decompose the bound water in a hydrated CBPC through a process referred to as radiolysis, resulting in the generation of hydrogen gas. The hydrogen gas can pressurize storage containers or other waste forms, which can cause the containers or waste forms to fracture and admit intrusion of moisture (e.g., from air or groundwater or other elements). Water also tends to reflect nuclear radiation, increasing the chance that highly active radioactive waste could go critical if the waste loading is not kept artificially low.

A need exists for dewatered CBPC waste forms which exhibit improved resistance to radiolysis.

SUMMARY OF THE INVENTION

One aspect of the present invention is a method of stabilizing a waste in a chemically bonded phosphate ceramic (CBPC). The method consists of preparing a slurry including the waste, water, an oxide binder, and a phosphate binder. The slurry is then allowed to cure to a solid, hydrated CBPC matrix. Next, bound water within the solid, hydrated CBPC matrix is removed. Typically, the bound water is removed by applying heat to the cured CBPC matrix. Preferably, the quantity of heat applied to the cured CBPC matrix is selected to be sufficiently high to drive off water bound within the hydrated CBPC matrix, but is also sufficiently low to avoid volatilization of other non-water components of the matrix, such as metals and radioactive components. Typically, a temperature selected within the range of between 100° C.-200° C. will be sufficient to drive off bound water without removing other components from the matrix. Removal of the bound water increases the resulting waste form's resistance to radiolysis if the waste form is used to encapsulate radioactive waste. In addition, removal of the bound water from the final waste form can reduce the weight of the resulting dewatered waste form.

In another embodiment of the invention wherein the waste and water have been mixed prior to the preparation of the slurry, a select amount of water may be evaporated from the waste and water mixture prior to preparation of the slurry. This step can result in a smaller, lighter waste form having a higher percentage of waste contained within the form when compared to a form prepared by traditional methods. Further dewatering is possible by heating the cured waste form, as described above.

Another aspect of the invention is a direct anyhydrous CBPC fabrication method wherein water is removed from the slurry, typically by heating and mixing the slurry while allowing the slurry to cure. This method can result in a fully or partially dewatered CBPC waste form. If desired, a partially dewatered waste form can be fully dewatered by additional heating after the matrix has cured.

Additional aspects of the invention are ceramic matrix waste forms prepared by the methods disclosed above.

DETAILED DESCRIPTION OF THE PREFERRED EMBODIMENT

Figure 1:
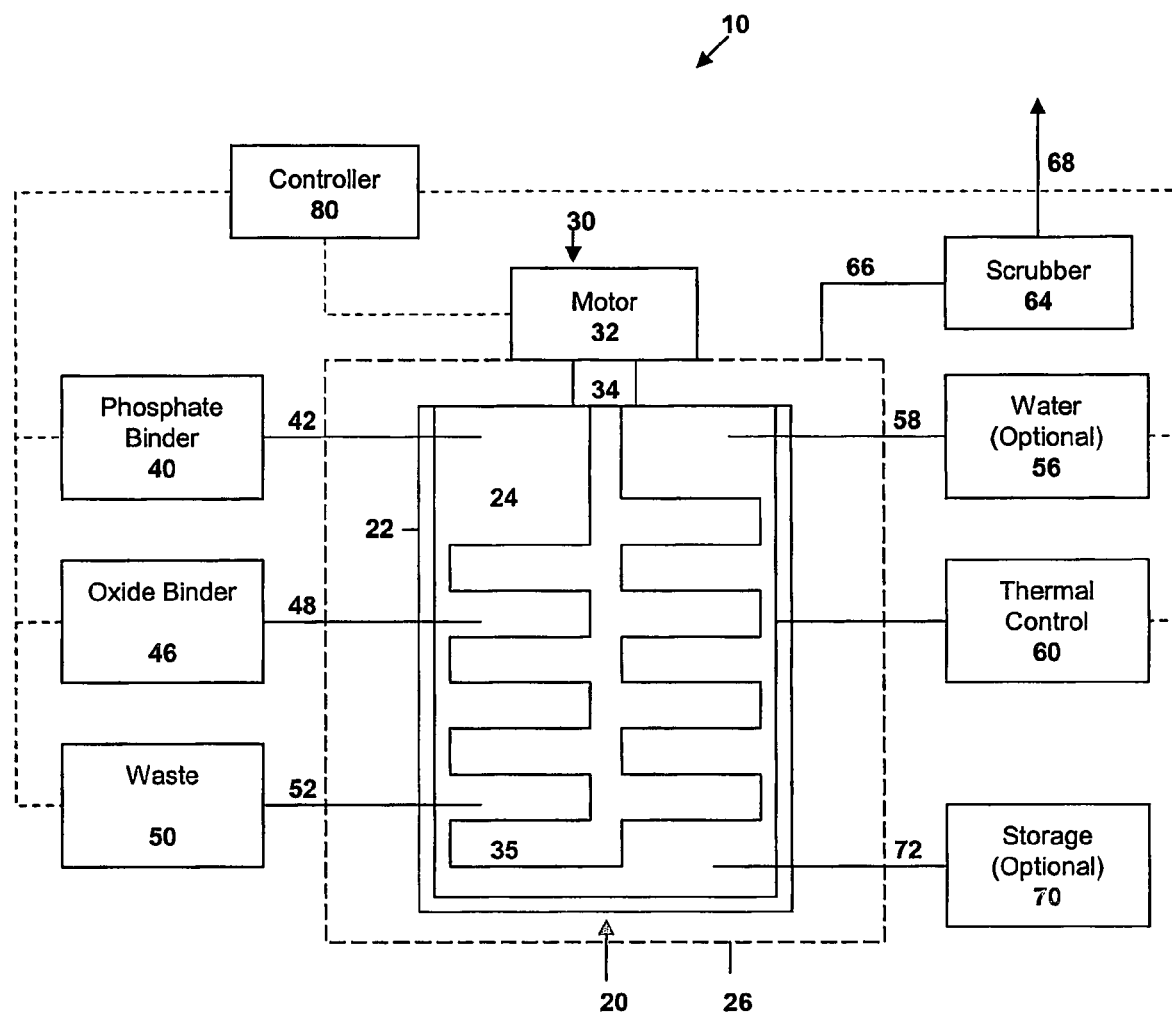
FIG. 1 is a schematic representation of a waste processing system.

Dewatered or anhydrous CBPCs as disclosed herein can be made from a typical hydrated CBPC waste form. Therefore, the following disclosure first contains a discussion of the preparation of a hydrated CBPC waste form, followed by a discussion of dewatering techniques.

This application claims priority to U.S. Provisional Application Ser. No. 60/450,563, entitled PHOSPHATE BONDED CERAMIC STABILIZATION CHEMISTRY APPLIED TO HIGH LEVEL RADIOACTIVE WASTES, filed on Feb. 26, 2003; this application also claims priority to U.S. Provisional Application Ser. 60/499,453, entitled ALUMINUM PHOSPHATE CERAMICS FOR HAZARDOUS WASTE STORAGE, filed on Sep. 2, 2003; and this application also claims priority to U.S. Provisional Application Ser. No. 60/537,207, entitled ALUMINUM PHOSPHATE CERAMICS FOR HAZARDOUS WASTE STORAGE, filed on Jan. 18, 2004 which three provisional applications are incorporated herein in their entirety by reference. This application incorporates by reference commonly assigned and copending U.S. patent application Ser. No. 10/547,100, entitled ALUMINUM PHOSPHATE CERAMICS FOR WASTE STORAGE, filed on even date herewith.

I. Synthesis of Hydrated CBPC

Chemically bonded phosphate ceramics (CBPCs) of various types have proven effective in encapsulating and stabilizing solid and liquid wastes. Magnesium-potassium phosphate hydrate (MKP) is a particularly effective CBPC for stabilization of hazardous and radioactive wastes. The invention disclosed herein will be discussed with respect to MKP. However, the invention is applicable to any hydrated CBPC. MKP is formed by a reaction between magnesium oxide (MgO) and monopotassium phosphate ($KH_2PO_4$) in solution. The formation process is governed by the reaction

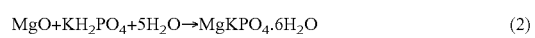

$$MgO + KH_2PO_4 + 5H_2O \rightarrow MgKPO_4.6H_2O \qquad (2)$$

This reaction yields the hard, dense ceramic MKP ($MgKPO_4.6H_2O$), which acts as a crystalline host matrix for the waste. During the reaction, the hazardous and radioactive contaminants also react with $KH_2PO_4$ to form highly insoluble phosphates. The bulk ceramic then microencapsulates the reacted contaminants in the dense crystalline matrix of MKP.

MKP waste forms are fabricated by slowly stirring a mixture of the waste, MgO, and $KH_2PO_4$ in water. Because of the dissolution of the $KH_2PO_4$, the solution contains ions of potassium, dissociated potassium, phosphates and protons ($H^+$) and is therefore acidic. The acidity of the solution increases the solubilities of MgO, oxides of hazardous metals, and to some extent, radioactive contaminants, and leads to the dissolution of the MgO and the contaminants. This, in turn, leads to the release of $Mg^{2+}$ and metal ions of the contaminants. These cations subsequently react with the aqueous phosphate ions to produce phosphates.

To form a ceramic of MKP, it is necessary that $Mg^{2+}$ reacts slowly with the phosphate ions. On the other hand, it is necessary that the hazardous metals and radioactive components react rapidly so they can be encapsulated as phosphates within the MKP matrix. If the metals and radioactive components react at a rate that is slower than the formation of the MKP matrix, sufficient phosphate anions will not be available to react with the waste components and they will not be fixed within the matrix. Thus, for superior stabilization, it is necessary that contaminants be converted to phosphates nearly spontaneously.

The setting reaction given by equation 2 may be quantitatively formulated by studying the thermodynamics of dissolution and overall reactions of the oxides in the $KH_2PO_4$ solution. $KH_2PO_4$ has high solubility and its dissolution is represented by $$KH_2PO_4 = 2H^+ + KPO_4^{2-} \tag{3}$$

(also, some K ionizes as shown by formation of some $KNO_3$)

where the superscripts represent the ionic charge. This reaction is endothermic and occurs before other components dissolve. When an alkaline oxide such as MgO is stirred into the acidic phosphate solution, the pH of the solution slowly rises because the acid is neutralized. Initially, the pH of the $KH_2PO_4 \approx 4$, but dissolution of the oxide neutralizes the acid solution and subsequently leads to the formation of ceramics at a pH of $\approx 8$.

In the presence of the $2H^+$ ions released by the $KH_2PO_4$, MgO dissolves by the reaction $$MgO + 2H^+ = Mg^{2+}(aq) + H_2O \tag{4}$$

where (aq) means the ion is aquated. Equations 2-4 form the basis for binder development in MKP, and is typical of a CBPC process. The ions from equations 3 and 4, along with five additional moles of water, react to form the matrix material $MgKPO_4 \cdot 6H_2O$ as given in equation 2.

As is discussed in U.S. Pat. No. 5,830,815, issued to Wagh, et al., both liquid waste and solid waste can be stabilized and encapsulated in MKP. In the case of a solid waste, the solids are typically first ground to a powder and then added to the phosphate binder to form a reaction slurry.

The stabilization process with MKP or many other CBPCs can be applied to both high pH waste streams and low pH waste streams. The MKP stabilization process is functional between a range of pHs of about 2 to 10 Typically, high pH wastes can be neutralized to within the operable range by the addition of phosphoric acid ($H_3PO_4$). Similarly, low pH wastes can be neutralized to within the operable pH range with the addition of additional magnesium oxide (MgO) or other similar oxide base. Neutralization is necessary to bring the slurry into the range where dissolution of binder constituents and waste constituents can occur and the necessary acid base reactions take place. An ancillary benefit which may make a MKP or other CBPC waste form more suitable for storing radioactive waste occurs if magnesium oxide (MgO) or other similar oxide base is added in an amount in excess of the stoichiometric amount necessary to form the CBPC matrix. In this instance, the excess magnesium oxide (MgO) or other oxide base may function as a getter material binding free hydrogen gas as it forms and thereby reducing the effects of radiolysis. Other materials which do not participate in the formation of the ceramic matrix may also be added to perform a getter function if desired.

The use of magnesium oxide (MgO) or other metal oxides is particularly effective when stabilizing nitric acid type wastes. Not only does the metal oxide neutralize the acidity of the waste, but a metal oxide such as magnesium oxide (MgO) will capture the nitrates and hold them in solution so nitric acid does not volatilize when heat is applied, facilitating the conversion of the nitrates into more stable phases in the ceramic.

As is described in U.S. Pat. No. 6,133,498, issued to Singh, et al., which is incorporated herein by reference, it can be useful to incorporate an oxidation or reduction step into the MKP formation process to control the rate of the acid-base reaction in the formation of the phosphate ceramic system. Also, the addition of certain reducing agents aids in the stabilization of radioactive and/or hazardous waste materials containing metal anions. Suitable reducing agents are preferably selected from a group including, but not limited to, sodium monosulfide ($Na_2S$), potassium monosulfide ($K_2S$), calcium sulfide (CaS), iron sulfide (FeS), iron sulfate ($FeSO_4 \cdot 7H_2O$), sodium thiosulfate ($Na_2S_2O_5$), sulfur dioxide ($SO_2$), sodium borohydride ($NaBH_4$), hydrazine, sodium bisulfite ($NaHSO_3$), calcium hydroxide ($Ca(OH)_2$), sodium hydroxide (NaOH), sodium carbonate ($Na_2CO_3$), sulfuric acid ($H_2SO_4$), and formic acid (HCOOH), among others. Preferably, the reducing agent is a stannous salt, such as tin chloride ($SnCl_2$).

Various other CBPCs are known which are more or less suitable for the encapsulation of waste. Alternative CBPCs include, but are not limited to, newberyite (MgHPO.sub4.3H.sub2O), magnesium-sodium phosphate, zirconium phosphate, and as is disclosed in the commonly assigned and contemporaneously filed application Ser. No. 10/547,100, entitled ALUMINUM PHOSPHATE CERAMICS FOR WASTE STORAGE, aluminum phosphate (AlH.sub3(PO.sub4).sub2.nH.sub2O).

It is important to note that each of the above CBPC materials is a hydrated ceramic. A hydrated ceramic is a ceramic which has water molecules bound within the ceramic matrix. For example, stoichiometrically prepared MKP, prepared as discussed in detail above, will have six water molecules bound within the crystal matrix for each magnesium-potassium phosphate ($MgKPO_4$) molecule. As discussed in detail below, the water bound within the CBPC matrix can compromise the stability and effectiveness of CBPC for stabilizing and encapsulating certain types of wastes. If excess water is present, certain CBPC materials may have up to 22 moles $H_2O$ bound within the ceramic matrix per mole of ceramic molecules.

CBPC methods are useful for the stabilization and encapsulation of a wide variety of wastes including, but not limited to, ash, cement, silica, red mud, pot-liner residue, pyrophorics, salt mixtures, volatiles such as mercury, lead, cadmium, chromium, and nickel. Of particular importance to this invention, radioactive materials may be stabilized by these methods. Such materials including uranium, plutonium, thorium, americium, fission products, high level radioactive wastes, low level radioactive wastes derived from high level radioactive wastes, transuranics, and other types of radioactive wastes. In addition, CBPC methods are useful for stabilizing both wastes and non-wastes in liquid, solid, or sludge form, and other nuclear materials such as the byproducts of legacy weapons and nuclear power production processes.

The CBPC processes described above are also effective in stabilizing liquid, solid, and sludge wastes having a high proportion of leachable salt ions such as sodium (Na), nitrate ($NO_3$), nitrite ($NO_2$). Sulfates and chlorides may also be stabilized within a CBPC matrix. It is believed that a CBPC made with a salt waste component will comprise a ceramic matrix of $MgNaPO_4 \cdot nH_2O$, which mineral appears to stabilize $NaKNO_3$, appears to stabilize $NO_3$ partially and may consist of various appetite mineral forms of the following chemical formulae:

$$Mg_5(PO_4)_3 \cdot X, Mg_2(PO_4) \cdot X, \text{ where } X=Cl, SO_4, NO_3 \tag{5}$$

It is further believed that a similar and related class of minerals can be formed in CBPC processes in which the magnesium (Mg) is replaced by calcium (Ca) or by any other divalent metal ion.

However, hydrated CBPCs, because of the bound water within the ceramic matrix, have proven somewhat problematic for stabilizing radioactive wastes, particularly high activity radioactive wastes. As discussed above, radioactive wastes typically radiate $\alpha$-, $\beta$-, n-particles, and $\gamma$-rays, which can cause radiolysis and the generation of hydrogen gas. In addition, the significant volume and weight of a solid waste form is also a known shortcoming of waste storage employing hydrated CBPCs. As discussed in detail below, the present invention discloses methods of dewatering a CBPC waste form, thereby reducing the risk of radiolysis, reducing the weight of the final waste form, and in some cases reducing the volume of the final waste form. For highly radioactive wastes and materials, the system and container handling may be remote controlled.

II. Waste Processing Apparatus

The embodiments of this invention and techniques disclosed for producing wholly or partially dewatered CBPC will be discussed below in the context of an apparatus for preparing a CBPC waste form, shown schematically in FIG. 1. It should be noted that the apparatus shown in FIG. 1 is merely representative of any number of suitable apparatus for implementing the invention disclosed herein.

As shown in FIG. 1, the waste processing system 10 includes a waste processing vessel 20 having walls 22 defining a vessel interior 24. The vessel 20 can be open, as shown, or closeable. The waste processing vessel 20 may be a conventional storage tank of the type currently used to hold some liquid wastes, e.g., liquid radioactive wastes. Depending on the nature of the waste being processed, it may be advantageous to effectively enclose the waste processing vessel 20 within a "glove box" 26 or similar enclosure to limit the spread of radioactive material or other hazardous components of the waste.

A phosphate binder such as potassium phosphate ($KH_2PO_4$) may be delivered to the vessel interior 24 from a phosphate supply 40 via a phosphate delivery line 42. An oxide binder such as magnesium oxide (MgO) may be delivered to the vessel interior 24 from an oxide supply 46 via an oxide delivery line 48. Suitable CBPCs may be made using other divalent oxide binders such as calcium (Ca), aluminum (Al) or any other divalent metal oxide. Waste from a waste supply 50 may be delivered via a waste delivery line 52 to the vessel interior 24. If needed, water from a water supply 56 may be delivered to the vessel interior 24 via a water delivery line 58.

A mixing system 30 may be used to mix the materials added to the vessel interior 24. The mixing system 30 of FIG. 1 includes a motor 32, which may be positioned outside the glove box 26 to limit contamination, coupled to a mixer 34 via a releasable coupling 36. The mixer 34 in FIG. 1 is schematically illustrated as a series of laterally extending blades or paddles, but this is solely for purposes of illustration and any suitable shape may be used. The coupling 36 may be adapted to selectively engage the shaft of the mixer 34 for rotation by the motor 32, yet allow the mixer 34 to be readily decoupled from the motor 32. For example, the coupling 36 may provide a spline connection between the mixer 34 and the motor 32, allowing the mixer 34 to be selectively coupled or decoupled from the motor 32 by axial movement. In other embodiments, the mixing system 30 shown in FIG. 1 may be replaced by any variety of systems that will effectively mix the materials added to the vessel interior 24.

The waste processing system 10 may also include a thermal control 60 operatively coupled to the glove box 26 and/or the waste processing vessel 20 to control the temperature of the material in the vessel interior 24. The thermal control 60 may, for example, comprise a fluid jacket for circulating heated or cooled fluid around the vessel 20. Alternatively, the thermal control 60 may comprise a microwave source or a series of infrared heating panels adapted to direct radiation onto and/or into the vessel 20. In other embodiments, no thermal control 60 is used. This may be useful if the reaction in the vessel is sufficiently exothermic to heat the contents to the desired temperature.

As explained in more detail below, water may be driven off the contents of the vessel interior 24 during processing. If the nature of the waste in the waste supply 50 so dictates, the water vapor and any other gas in the glove box 26 may be delivered to a scrubber 64 via a gas line 66. After scrubbing in the scrubber 64 to remove any hazardous volatile material, the gas may be vented to the atmosphere via a vent line 68.

The processed waste may be allowed to cure in the vessel 20. Alternatively, it may be advantageous to remove the mixed components from the vessel 20 before they cure, e.g., in a continuous process instead of a batch process. In such an implementation, the contents of the vessel 20 may be delivered to a storage vessel 70 via an outlet 72.

A controller 80 may be used to control aspects of the waste processing system 10. The controller 80 may be operatively coupled to one or more of the mixing system 30, the thermal control 60, the phosphate supply 40 or delivery line 42, the oxide supply 46 or delivery line 48, the waste supply 50 or delivery line 52, and the water supply 56 or delivery line 58. The controller 80 may comprise at least one computer having a programmable processor programmed to control operation of these components to process the waste in the waste supply 50.

III. Preparation of Dewatered CBPC Waste Forms from Cured Hydrated CBPC Waste Forms As noted above, a cured hydrated MKP waste form has at least six water molecules bound within the ceramic matrix for each magnesium-potassium phosphate ($MgKPO_4$) molecule. This bound water can be driven out of the waste form after curing has taken place. Other typical CBPCs are also hydrated to some extent. Although the invention disclosed herein is discussed with respect to MKP, the invention is applicable to any hydrated CBPC.

Typically, the bound water within the MKP matrix is driven off by the application of heat to the cured waste form. Preferably, the quantity of heat applied to the cured waste form will be selected to drive off bound water, yet the heat will be limited to avoid volatilizing other components of the waste form. Generally, heat in excess of 100° C. is preferably applied to the waste form in order to drive off bound water. Preferably, the waste form is not heated to a temperature of over 200° C., in order to avoid volatilizing bound heavy metals and radioactive contaminants. The above range of temperatures for effective dewatering of a hydrated CBPC waste form without volatilizing other components of the waste form can change depending upon the nature of the ceramics or wastes contained therein and the contaminants contained therein. For any type of CBPC, it is preferred that the heating temperature be selected above the minimum temperature necessary to drive off water, and below the temperature where volatilization of contaminants might occur. Application of heat for a sufficient period of time will result in transition of all or a portion of the ceramic waste form to an anhydrous MKP ceramic ($MgKPO_4$).

Although the application of heat is the most typical method of driving bound water from a hydrated CBPC waste form, other suitable methods may be employed. For example, reducing the pressure over the waste form in a vacuum chamber may result in partial dewatering of the waste form. The application of ultrasonic or light energy may accelerate the process.

The partial or complete dewatering of a hydrous CBPC waste form after it has cured will not reduce the final size of the cured form. However, the weight of the form will be reduced, and the effects of radiolysis can be minimized if the form has been used to encapsulate radioactive waste. Applicant has determined experimentally that partial or complete dewatering of an MKP waste form can be accomplished at temperatures as low as between 120° C.-130° C. Dewatering was confirmed by Differential Thermal Analyses (DTA) for waste forms encapsulating two distinct types of waste streams. The first waste form was prepared according to the methods detailed above for the encapsulation of waste in MKP, with the addition of a liquid waste stream simulating a cesium (Cs), tecnitium (Tc), strontium (Sr), and TRU bearing supernate. Also discussed below is a second waste form which was prepared similarly, but prepared with a simulated sludge waste stream having an extract of Cs, Tc, Sr, and TRUs from other streams and combined into the tank sludge. The physical properties of the two waste forms are shown in Table I.

TABLE I

Physical Properties of the Waste Forms

| Property | First Form Supernate Waste Stream | Second Form Sludge + Extract Waste Stream |
| --- | --- | --- |
| Density (g/cm$^3$) | 1.88 | 1.72 |
| Approximate open porosity (vol.) | 7.9 | 4.5 |
| Compressive strength (psi) | 1,800-3,500 | |

Figure 2:
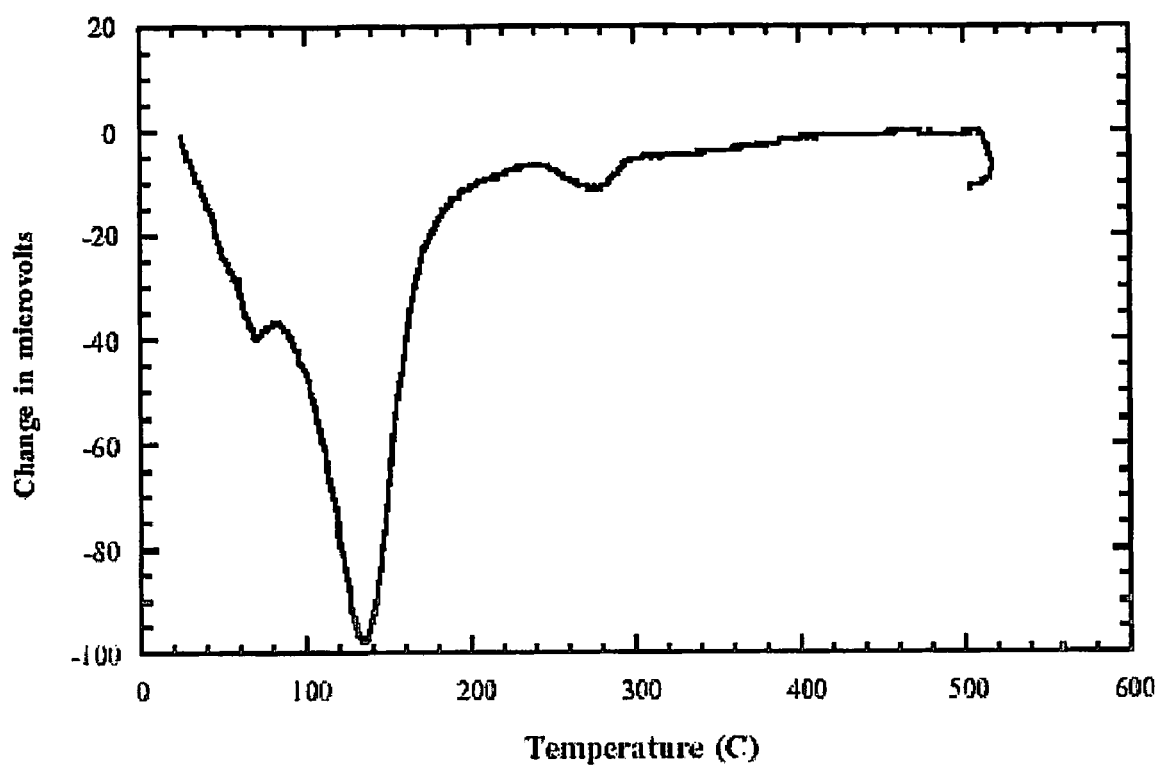
FIG. 2 is a graph of the differential thermal analysis of a CBPC waste form being dewatered.

FIG. 2 shows the Differential Thermal Analysis of the first MKP waste form encapsulating the supernate waste stream. In FIG. 2, the y-axis represents the change in micro-volts of the micro balance that indicates the rate of loss in weight of the material due to heating. As the temperature is increased, the weight keeps dropping, indicating loss of some component of the waste form. This loss has been identified with differential scanning calorimetry (DSC) as that of bound water of the matrix. Equation 6 describes this evolution of water.

$$MgKPO_4 \cdot 6H_2O = MgKPO_4 + 6H_2O \quad (6)$$

In the study graphically represented in FIG. 2, when the temperature reached 128° C., the bound water from the matrix escaped the waste form. Beyond that, there was no loss of weight except at ≈260° C. where again there was a slight loss, representing other components of the waste form.

The amount of water that will escape from the waste forms will depend on how strongly this water is bound in the mineral matrix of each of the waste forms. To assess the escape of bound water in the present study, samples of waste forms encapsulating both types of waste were heated for three hours, cooled, and the loss in weight was measured. The weight loss data is given in Table II.

While calculating the percent water lost after heating (shown in the third column of Table II), bound water residing in the nitrate components in the tested waste forms was not included. It is not clear at this point whether such water will also escape at temperatures below 200° C. It is very likely that the bound water from individual minerals may escape only at some higher temperatures such as 260° C. as indicated in FIG. 2.

TABLE II

Weight Reduction Associated with Dewatering of MKP Waste Forms

| Sample Identity | Water Before Heating (wt. %) | Water Lost During Heating (wt. %) |
| --- | --- | --- |
| Supernate waste stream | 46.6 | — |
| First waste form | 18.5* | 15.3 |
| Sludge/extract waste stream | 74.8 | — |
| Second waste form | 32.25* | 33.75 |

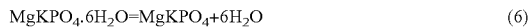
*Bound water from the binder component MgKPO$_4$•6H$_2$O in the waste form The results of heating given in column 3 of Table II imply that in the case of the second (sludge/extract) waste form all the bound water of the matrix has escaped. The actual loss of the water after heating is slightly more than the estimated amount of water in the waste form. This may be because some of the bound water from the minerals might also have escaped. In the case of the first waste form, however, only 75 wt. % water has escaped. At this time, the cause of retention of some of the water in this waste form is not known with certainty. It is likely that all the matrix bound water did escape, but some might have been reabsorbed during cooling of the samples. Also, the water retention could be related to the fact that the supernate based waste stream contained a significantly higher nitrated content than the sludge+extract stream. Determination of the mechanisms of partial retention of the water will require additional studies, but it is clear that much or all of the bound water from both waste forms escapes the matrix in the temperature range of 120° C.-150° C.

IV. Minimization of Bound Water During MKP Formation Process

The quantity of bound water within a CBPC matrix for a given waste quantity, along with the volume and weight of the resulting waste form can be minimized by carefully controlling the amount of water present in the formation reactions. By partially dewatering the liquid or slurry waste stream prior to mixing the waste stream with the appropriate CBPC binders, the quantity of water present can be reduced to the minimum quantity necessary to drive the reactions resulting in a corresponding decrease in the amount of binder used. Waste forms prepared in this manner will be smaller and lighter than waste forms prepared in the conventional manner for a particular level of waste loading, and will require the use of less energy for subsequent dewatering.

Tables III and IV below present a series of process steps for the preparation of MKP waste forms after removing a select amount of water from the liquid or slurry waste stream by heat evaporation, centrifuge, filtration, or other separation method prior to mixing the waste stream with the oxide and phosphate binders. The process disclosed is applicable to other CBPC formulations. For each sample shown on Table III or Table IV, the initial waste amount is constant. Evaporation of a select portion of the water present in the input waste stream allows the use of correspondingly less oxide and phosphate binders. Accordingly, the final total weight and volume of the ceramic waste form is decreased by a significant percentage, resulting in a correspondingly higher final waste loading. A small amount of a reducing agent, sodium sulfide (Na$_2$S) was added to the first (cesium supernatant) waste stream to stabilize hexavalent chromium and phosphoric acid (H$_3$PO$_4$) was used to neutralize the second sludge/extract waste stream. These steps enhance the overall waste stabilization chemistry, and do not appear to hinder the final waste form size and weight reductions achieved by partial dewatering of the input streams.

TABLE III

Cesium Supernatant Waste Form Dewatering (all weights in grams)

| Action | Parameters for Each Set of Samples | | | |
|---|---|---|---|---|
| Initial waste amount (g) | 300 | 300 | 300 | 300 |
| Initial volume of the waste (ml) | 210 | 210 | 210 | 210 |
| Evaporate this amount of water (g) | 63 | 78 | 93 | 108 |
| Water that remained in the waste after drying (g) | 75 | 60 | 45 | 30 |
| Add this amount of $Na_2S$ and mix well (g) | 1.5 | 1.2 | 0.9 | 0.6 |
| Add binder and mix (g) | MgO 37.5 $KH_2PO_4$ 112.5 | MgO 30 $KH_2PO_4$ 90 | MgO 22.5 $KH_2PO_4$ 67.5 | MgO 15 $KH_2PO_4$ 45 |
| Final total weight of ceramic (g) | 387 | 342 | 327 | 252 |
| Final total volume of ceramic (ml) | 215 | 190 | 182 | 140 |
| Volume reduction (%) | −3 | 9 | 13 | 33 |
| Final waste loading (wt. %) | 61 | 65 | 72 | 76 |

Although partial dewatering of the input waste streams will allow the preparation of a smaller, lighter final waste form, the MKP matrix still has bound water within the matrix. If necessary to address radiolysis concerns, the forms prepared with partially dewatered input streams can be dewatered after curing to drive the bound water from the matrix as described above.

V. Direct Preparation of Anhydrous CBPC Waste Forms

Both of the techniques discussed above involve two step preparation processes if a final anhydrous waste form is to be achieved. First, a hydrated CBPC waste form is prepared, which may be reduced in weight by partial dewatering of the input waste streams. Second, the cured waste form is partially or fully dewatered by the application of heat or another dehydrating method to the solidified matrix. A third technique can be employed to directly prepare an anhydrous CBPC waste form.

In the following discussion of anhydrous CBPC methods, reference is made to the waste processing system 10 shown in FIG. 1. Also, the invention is disclosed with respect to MKP preparation. It should be understood that this is solely for purposes of illustration and that the following methods are not limited to use of the particular structures, systems, or types of CBPC shown in the drawings or discussed above.

As discussed above, $KH_2PO_4$ from the phosphate supply 40, MgO from the oxide supply 46, waste from the waste supply 50, and, optionally, water from the water supply 56 may be added to the waste processing vessel 20 of FIG. 1. These materials may be mixed with the mixing system 30 to form a slurry.

The relative proportions of the phosphate binder, oxide binder, and waste added to the waste processing vessel 20 will depend, at least in part, on the nature of the waste materials. For example, one may add more of a liquid waste having a high water content than may be appropriate if the waste were

TABLE IV

Sludge/Extract Waste Form Dewatering (all weights in grams)

| Action | Parameters in Each Test | | | | Remaining Waste |
|---|---|---|---|---|---|
| Initial waste amount (g) | 300 | 300 | 300 | 300 | 800 |
| Initial volume of the waste (ml) | 227.8 | 227.8 | 227.8 | 227.8 | 606 |
| pH of the waste | 13.8 | | | | |
| Neutralize the waste with 14 wt. % concentrated $H_3PO_4$ solution | Add 82 grams of the solution to get to the pH <9. The amount of water in this solution will be 70.5 grams and the rest is $H_3PO_4$. | | | | |
| Evaporate this amount of water (g) | 220 | 235 | 250 | 265 | |
| Water that remained in waste after drying (g) | 75 | 60 | 45 | 30 | |
| Binder (g) | MgO 37.5 $KH_2PO_4$ 112.5 | MgO 30 $KH_2PO_4$ 90 | MgO 22.5 $KH_2PO_4$ 67.5 | MgO 15 $KH_2PO_4$ 45 | |
| Final weight of ceramic | 300 | 255 | 210 | 175 | |
| Final volume of ceramic (ml) | 174 | 148 | 122 | 96 | |
| Volume reduction (%) | 23 | 35 | 46.3 | 58 | |
| Final waste loading (wt. %) | 50 | 53 | 57 | 63.6 | | a dry waste or had a lower water content. It is anticipated that waste loading (i.e., the proportion of waste in the final solid waste form) as high as about 85 weight percent (dry weight basis) may work for many types of waste. For wastes that are likely to leach hazardous materials (e.g., heavy metals), lower waste loadings may be more appropriate. For example, it is anticipated that some heavy metal-bearing waste streams may be limited to 70 weight percent of the final solid waste form.

The temperature of the reactants in the waste processing vessel 20 may be controlled with the thermal control 60 to drive off excess water in a measured fashion and to control the nature of the resultant reaction product. If one were to mix the slurry described above at about room temperature, as is conventional for most CBPC waste storage systems, the reaction of the oxide binder and the phosphate binder would yield MKP, $MgKPO_4.6H_2O$. To avoid the likelihood of radiolysis in the cured waste form by creating anydrous MKP, the oxide and $KH_2PO_4$ slurry may be allowed to react at an elevated temperature sufficient to drive off water as the ceramic matrix forms. As noted above, some components of hazardous waste streams, e.g., HgCl, begin to volatilize at elevated temperatures. To limit such volatilization, it may be desirable to react the slurry oxide and the $KH_2PO_4$ at a temperature above the temperature necessary to drive off water as the matrix forms, but below the temperature where volatilization of other components of the ceramic matrix or contaminants might be volatized. Typically, this temperature will be within the range of 100° C.-200° C.

In one exemplary embodiment for processing a waste including a heavy metal or radioactive component, the slurry may be mixed at a temperature of less than 100° C. as described above in the basic process instructions for preparing a hydrated CBPC. During this initial, relatively low temperature mixing period, the heavy metals or radioactive waste components of the waste stream can form highly insoluble phosphate components which will later be encapsulated in the ceramic matrix. It is anticipated that a time of about 10-15 minutes will suffice for the contaminants of many waste streams to form insoluble phosphates. Subsequently, the thermal control 60 may be used to ramp up the temperature gradually while mixing the slurry so that a portion of the water which would have become bound within the ceramic matrix is driven off as the ceramic matrix cures. Implementation of a ramped heating cycle may limit the volatilization of radioactive, heavy metal waste or other contaminants prior to the formation of insoluble phosphates.

The mixing system 30 may continue to mix the slurry as water evaporates from the reactants in the vessel 20. In addition to keeping the components well mixed, the mixing will help release water vapor from the slurry as heat is applied. This, in turn, will reduce voids in the solid waste form, increasing its strength and reducing its volume. The pore volume of the final solid waste form ideally will become less than about 5% of the volume of the solid waste form, but at this time it is unknown if this porosity is achievable. Some MKP formulations with porosity less than about 1% have been prepared, although without also attempting to minimize waste form volume at the same time.

As the reaction proceeds and water is driven off, it will become increasingly difficult to drive the mixer 34. The mixing system 30 may stop mixing the slurry when the slurry reaches a terminal consistency. If desired, salts, including nitrates, may be added to the slurry to slow down the speed of the ceramicrete curing reactions to help control the process of waste encapsulation, allowing full matrix formation to occur before all the water is evaporated or otherwise removed. The terminal consistency may be determined in a number of ways. It may be determined by monitoring a force required to drive the mixer 34 with the motor 32; once the requisite driving force reaches a predetermined limit, the controller 80 may terminate operation of the motor 32, allowing the mixer 34 to stop. If so desired, the mixer 34 may then be lifted out of the reaction vessel 20 and reused for another reaction vessel. Alternatively, the mixer 34 may be left in the slurry as it hardens into the final solid waste form. The releasable coupling 36 between the mixer 34 and the motor 32 will facilitate separation of the solid waste form, including the mixer 34, from the motor 32. A new mixer 34 may then be coupled to the motor 32 for processing the next batch of waste.

After mixing is terminated, the reactants in the slurry may be allowed to finish curing into a solid waste form. To enhance uniformity of the solid waste form, the slurry at the terminal consistency should be sufficiently stiff to avoid undue settling of the components of the slurry. Sufficient heat applied during the mixing and curing process can result in the direct formation of an anhydrous CBPC product, such as anhydrous MKP ($MgKPO_4$). Waste forms prepared by the direct anhydrous method will exhibit reduced volume, and reduced weight for a given amount of waste encapsulated when compared to waste forms prepared by conventional hydrated CBPC methods. If the waste form prepared by the anhydrous method is only partially dewatered, further dewatering can be accomplished by heating the cured waste form as described above.

Still other aspects, objects, and advantages of the present invention can be obtained from a study of the specification, the drawings, and the appended claims.

The invention claimed is:

1. A method of stabilizing a radioactive waste in chemically bonded phosphate ceramic comprising:
   preparing a slurry comprising the radioactive waste, water, an oxide binder and a phosphate binder, wherein the oxide binder is MgO;
   allowing the slurry to cure to a solid hydrated chemically bonded phosphate ceramic matrix; and
   removing bound water from the solid hydrated chemically bonded phosphate ceramic matrix, wherein the hydrated ceramic matrix is heated to a select temperature between a lower first temperature where the bound water begins to be driven from the hydrated ceramic matrix and a higher second temperature where non-water components of the hydrated ceramic matrix are volatilized.

2. The method of claim 1 wherein the waste and the water have been mixed prior to the preparation of the slurry and further comprising removing a select amount of water from the waste and water mixture prior to preparation of the slurry.

3. The method of claim 1 further comprising removing water from the slurry while mixing the slurry or allowing the slurry to cure.

4. The method of claim 3 wherein the water is removed from the slurry through evaporation by heating, and wherein the slurry is heated to a select curing temperature between a first curing temperature where water is removed from the slurry as it cures and a second curing temperature where non-water components of the slurry are volatilized.

5. The method of claim 1 further comprising adding a select amount of a reducing agent or an oxidizing agent to the waste or the slurry prior to allowing the slurry to cure.

6. The method of claim 1 wherein the waste has a first pH level, and further comprising adding a neutralizing material to the waste before allowing the slurry to cure to at least partially neutralize the waste so the waste has a second pH level different from the first pH level.

7. The method of claim 1, further comprising adding a beta-absorptive, gamma-absorptive, alpha-absorptive, or neutron-absorptive material directly to the waste before allowing the mixed slurry to cure.

8. The method of claim 1, further comprising dewatering the waste during or before the waste is combined with the oxide binder and the phosphate binder.

9. The method of claim 1, further comprising adding a neutralizing material to the waste to at least partially neutralize the waste before the waste is combined with the oxide binder and the phosphate binder.

10. The method of claim 1 further comprising at least partially de-watering the waste before allowing the slurry to cure.

11. The method of claim 1, further comprising adding an $H_2$ getter agent to the waste or the slurry to reduce $H_2$ gas generation.

12. The method of claim 1 wherein the waste is an acidic waste, further comprising neutralizing the waste with at least one metal oxide.

13. The method of claim 1 wherein the waste is a basic waste, having a pH level further comprising reducing the pH level by adding a neutralizing agent.

14. The method of claim 1, further comprising adding a salt to the slurry to control reaction rates during mixing of the slurry.

15. The method of claim 1, further comprising adding a stabilizing agent or a reducing agent to the waste or the slurry to decrease solubility of constituents of the waste.

16. The method of claim 1, further comprising adding an exothermic agent to the waste or the slurry that reacts and heats the waste or the slurry.

17. The method of claim 1, further comprising adding to the waste or the slurry a shielding agent for neutrons, alpha particles, beta particles, or gamma particles in the waste to provide an at least partially self-shielding waste.

18. The method of claim 1 wherein the hydrated ceramic matrix is in a vacuum chamber and the bound water is removed from the hydrated ceramic matrix by reducing a chamber pressure.

19. The method of claim 1 wherein the lower first temperature is approximately 100° C. and the higher second temperature is approximately 200° C.

20. A method of stabilizing a radioactive waste in chemically bonded phosphate ceramic comprising:
providing a mixture of the radioactive waste and water;
removing a select amount of water from the waste and water mixture to form a residual waste and water mixture;
preparing a slurry comprising the residual waste and water mixture, an oxide binder and a phosphate binder wherein the oxide binder is MgO;
allowing the slurry to cure to a solid chemically bonded phosphate ceramic matrix, wherein the solid chemically bonded phosphate ceramic matrix comprises bound water molecules; and
removing the bound water molecules from the solid chemically bonded phosphate ceramic matrix by heating.

21. The method of claim 20 wherein the select amount of water is removed from the waste and water mixture through evaporation by heating.

22. The method of claim 20 wherein the quantity of water removed from the waste and water mixture is selected to result in a solids content within the waste and water mixture, after the removal step, of equal to or less than 90% measured by weight of the residual waste and water mixture.

23. Method of claim 20 wherein the phosphate binder is $KH_2PO_4$.

24. The method of claim 20 further comprising adding a select amount of a reducing agent or an oxidizing agent to the waste or the slurry prior to allowing the slurry to cure.

25. A method of stabilizing a radioactive waste in chemically bonded phosphate ceramic comprising:
preparing a slurry comprising radioactive waste, an oxide binder and a phosphate binder, wherein the oxide binder is MgO;
removing a select amount of water from the slurry while mixing the slurry or allowing the slurry to cure;
allowing the slurry to cure to a solid chemically bonded phosphate ceramic matrix; and
driving off bound water from the solid chemically bonded phosphate ceramic matrix to form a solid matrix having reduced weight wherein driving off bound water from the solid chemically bonded phosphate ceramic matrix includes heating the solid chemically bonded phosphate ceramic matrix to a select temperature between a first temperature where the bound water begins to be driven off from the solid chemically bonded phosphate ceramic matrix and a higher second temperature where non-water components of the solid chemically bonded phosphate ceramic matrix are volatilized.

26. The method of claim 25 wherein removing the select amount of water from the slurry includes heating the slurry to a temperature greater than approximately 100° C., and wherein the first temperature for removing bound water from the solid chemically bonded phosphate ceramic matrix is approximately 100° C. and the second temperature for removing bound water from the solid chemically bonded phosphate ceramic matrix is approximately 200° C.

27. The method of claim 25 wherein the waste comprises a liquid waste.

28. A method of stabilizing a radioactive waste in chemically bonded phosphate ceramic comprising:
providing a mixture of the radioactive waste and water;
removing a select amount of water from the waste and water mixture to form a residual waste and water mixture;
preparing a slurry comprising the residual waste and water mixture, an oxide binder and a phosphate binder, wherein the oxide binder is MgO;
allowing the slurry to cure to a solid chemically bonded phosphate ceramic matrix; and
removing bound water from the solid chemically bonded phosphate ceramic matrix, wherein removing bound water from the solid chemically bonded phosphate ceramic matrix includes heating the solid chemically bonded phosphate ceramic matrix to a select temperature between a first temperature where the bound water begins to be removed from the solid chemically bonded phosphate ceramic matrix and a higher second temperature where non-water components of the solid chemically bonded phosphate ceramic matrix are volatilized.

29. The method of claim 28 wherein removing the select amount of water from the waste and water mixture includes heating the waste and water mixture to a temperature greater than approximately 100° C., and wherein the first temperature for removing bound water from the solid chemically bonded phosphate ceramic matrix is approximately 100° C. and the second temperature for removing bound water from the solid chemically bonded phosphate ceramic matrix is approximately 200° C.

* * * * *